（12） United States Patent
Sharp et al.

(10) Patent No.: US 11,740,536 B2
(45) Date of Patent: Aug. 29, 2023

(54) COMPACT POLARIZATION-BASED MULTI-PASS OPTICAL ARCHITECTURES

(71) Applicant: META PLATFORMS TECHNOLOGIES, LLC, Menlo Park, CA (US)

(72) Inventors: Gary D. Sharp, Boulder, CO (US); Anthony D. McGettigan, Santa Rosa, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 461 days.

(21) Appl. No.: 16/672,472

(22) Filed: Nov. 3, 2019

(65) Prior Publication Data
US 2020/0142276 A1   May 7, 2020

Related U.S. Application Data

(60) Provisional application No. 62/755,345, filed on Nov. 2, 2018.

(51) Int. Cl.
*G02F 1/31* (2006.01)
*G02B 5/30* (2006.01)
(Continued)

(52) U.S. Cl.
CPC ............ *G02F 1/31* (2013.01); *G02B 5/30* (2013.01); *G02B 17/004* (2013.01); *G02B 27/28* (2013.01); *G02B 27/286* (2013.01)

(58) Field of Classification Search
CPC .......... G02F 1/31; G02B 5/30; G02B 17/004; G02B 27/28; G02B 27/286
See application file for complete search history.

(56) References Cited

U.S. PATENT DOCUMENTS 4,859,031 A * 8/1989 Berman ............. G02B 27/0101
                                                       359/629
5,050,966 A * 9/1991 Berman ............. G02B 27/0101
                                                       349/194
(Continued)

FOREIGN PATENT DOCUMENTS

CN        108803061 A  * 11/2018
EP            537708 A1 *  4/1993  ......... G02B 27/1026
(Continued)

OTHER PUBLICATIONS

RMI, Partial Reflectors, http://rmico.com/laser-output-coupler, https://web.archive.org/web/20150401000000*http://rmico.com/laser-output-coupler, May 21, 2015 (Year: 2015).*
(Continued)

*Primary Examiner* — Peter Radkowski
(74) *Attorney, Agent, or Firm* — Greenberg Traurig, LLP (57) ABSTRACT

Optical systems that can produce digitally switchable optical power, optical pathlength, or both. It can apply to reconfigurable wide-angle optical systems that are compact, lightweight, and light-efficient. Architectures that increase pathlength can utilize polarization splitters to produce an additional round-trip of one or more optical cavities. Changing the focus distance of synthetic imagery in augmented/virtual reality systems is an example of an application where the techniques taught herein are particularly well suited. Passive double-cavity systems can be used to increase the throughput and decrease the stray-light/ghosts in polarization-based compact wide-angle lenses.

25 Claims, 9 Drawing Sheets

(51) Int. Cl.
*G02B 17/00* (2006.01)
*G02B 27/28* (2006.01)

(56) References Cited

U.S. PATENT DOCUMENTS

| | | | | |
|---|---|---|---|---|
| 5,371,617 A * | 12/1994 | Mitsutake | H04N 9/315 | 349/8 |
| 5,379,135 A * | 1/1995 | Nakagaki | H04N 9/3167 | 349/9 |
| 5,408,346 A * | 4/1995 | Trissei | G02B 5/3016 | 349/115 |
| 5,526,184 A * | 6/1996 | Tokuhashi | G02B 27/0172 | 359/489.07 |
| 5,585,946 A * | 12/1996 | Chern | H04N 9/30 | 349/5 |
| 5,596,451 A * | 1/1997 | Handschy | G02B 27/0172 | 359/639 |
| 5,654,827 A * | 8/1997 | Reichert | G02B 27/0101 | 359/640 |
| 5,654,828 A * | 8/1997 | Togino | G02B 25/001 | 359/633 |
| 5,715,023 A * | 2/1998 | Hoppe | G02B 27/0172 | 349/11 |
| 5,929,946 A * | 7/1999 | Sharp | H04N 9/3111 | 349/97 |
| 6,075,651 A * | 6/2000 | Hoppe | G02B 27/0172 | 359/641 |
| 6,384,982 B1 * | 5/2002 | Spitzer | G02B 27/0172 | 359/633 |
| 6,421,183 B1 * | 7/2002 | Ophey | G02B 27/0172 | 359/489.14 |
| 6,519,090 B2 * | 2/2003 | Endo | G02B 25/001 | 349/11 |
| 6,609,795 B2 * | 8/2003 | Weber | G02B 27/283 | 353/31 |
| 6,710,928 B2 * | 3/2004 | Roest | G02B 27/0172 | 359/633 |
| 7,411,730 B2 * | 8/2008 | Winterot | G02B 17/0852 | 359/368 |
| 7,460,247 B1 * | 12/2008 | Ackerman | G02F 1/3511 | 356/519 |
| 8,009,349 B2 * | 8/2011 | McDowall | G02F 1/09 | 359/318 |
| 8,379,136 B2 * | 2/2013 | Ortyn | G02B 21/00 | 348/350 |
| 8,493,520 B2 * | 7/2013 | Gay | G02B 30/27 | 345/173 |
| 8,674,312 B2 * | 3/2014 | Szupryczynski | G01T 1/22 | 250/366 |
| 8,767,284 B2 * | 7/2014 | McDowall | G03B 13/02 | 359/484.01 |
| 8,780,039 B2 * | 7/2014 | Gay | G02B 30/40 | 345/108 |
| 9,244,286 B2 * | 1/2016 | Evans | H04N 13/322 | |
| 9,557,568 B1 | 1/2017 | Ouderkirk | B29D 11/00644 | |
| 9,690,097 B2 * | 6/2017 | Tang | G02B 27/0172 | |
| 10,121,813 B2 * | 11/2018 | Eichenholz | G01S 7/4861 | |
| 10,254,407 B2 * | 4/2019 | Mohseni | G01S 7/4816 | |
| 10,338,393 B2 * | 7/2019 | Yun | G02B 17/0856 | |
| 10,451,904 B2 * | 10/2019 | McDowall | G02B 5/3083 | |
| 10,495,798 B1 * | 12/2019 | Peng | G02F 1/133555 | |
| 10,514,483 B2 * | 12/2019 | Heshmat Dehkordi | H04N 5/2621 | |
| 10,917,626 B2 * | 2/2021 | Akkaya | G01S 1/00 | |
| 11,002,898 B2 * | 5/2021 | Peng | G02B 27/283 | |
| 2003/0089956 A1 * | 5/2003 | Allen | G02B 27/281 | 257/432 |
| 2008/0051135 A1 * | 2/2008 | Destain | H04N 9/3176 | 348/E5.029 |
| 2008/0278812 A1 * | 11/2008 | Amitai | G02B 27/0172 | 359/485.05 |
| 2009/0097117 A1 * | 4/2009 | Coleman | B29D 11/0073 | 359/489.19 |
| 2009/0290079 A1 * | 11/2009 | Evans | H04N 13/322 | 359/479 |
| 2010/0002288 A1 * | 1/2010 | McDowall | G02B 15/143 | 359/318 |
| 2010/0177113 A1 * | 7/2010 | Gay | G02B 30/27 | 359/484.04 |
| 2011/0193814 A1 * | 8/2011 | Gay | G02B 30/25 | 345/173 |
| 2011/0310466 A1 * | 12/2011 | McDowall | G02B 27/144 | 359/302 |
| 2012/0013785 A1 * | 1/2012 | Ortyn | G02B 27/144 | 348/E5.024 |
| 2012/0147465 A1 * | 6/2012 | Ruhle | G02B 27/286 | 359/465 |
| 2013/0032722 A1 * | 2/2013 | Szupryczynski | G01T 1/2978 | 250/361 R |
| 2013/0057961 A1 * | 3/2013 | Evans | G02B 30/52 | 359/629 |
| 2013/0222384 A1 * | 8/2013 | Futterer | H04N 13/344 | 345/426 |
| 2013/0258491 A1 * | 10/2013 | Shiue | G02B 13/16 | 359/649 |
| 2016/0004137 A1 * | 1/2016 | Sagardoyburu | H10K 59/128 | 349/1 |
| 2016/0259059 A1 * | 9/2016 | Mohseni | G02F 1/017 | |
| 2017/0017077 A1 * | 1/2017 | Tang | G02B 5/003 | |
| 2017/0242278 A1 * | 8/2017 | McDowall | G02B 5/3083 | |
| 2018/0039004 A1 * | 2/2018 | Yun | G02B 27/144 | |
| 2018/0106936 A1 * | 4/2018 | Heshmat Dehkordi | G01S 17/894 | |
| 2018/0146186 A1 * | 5/2018 | Akkaya | H04N 13/296 | |
| 2018/0286909 A1 * | 10/2018 | Eichenholz | G01S 17/10 | |
| 2020/0049872 A1 * | 2/2020 | Peng | G02B 27/01 | |

FOREIGN PATENT DOCUMENTS

| | | | | |
|---|---|---|---|---|
| EP | 1258746 B1 | | 2/2008 | |
| GB | 2272980 A * | | 6/1994 | G02B 27/0101 |
| GB | 2449682 A * | | 12/2008 | G02B 27/2214 |
| GB | 2465786 A * | | 6/2010 | G02B 27/2221 |
| JP | 06342129 A * | | 12/1994 | G02B 27/017 |
| JP | 08110492 A * | | 4/1996 | G02B 25/001 |
| JP | 08122642 A * | | 5/1996 | G02B 27/0172 |
| WO | WO-8703164 A * | | 5/1987 | H05K 3/022 |
| WO | WO-0102893 A1 * | | 1/2001 | G02B 27/0172 |
| WO | WO-2007054928 A1 * | | 5/2007 | G02B 27/0081 |
| WO | WO-2008129539 A2 * | | 10/2008 | G02B 23/02 |
| WO | WO-2009049265 A1 * | | 4/2009 | B29D 11/00634 |
| WO | WO-2012142002 A1 * | | 10/2012 | A61F 13/00055 |
| WO | WO-2015157016 A1 * | | 10/2015 | G02B 27/0093 |
| WO | WO-2017213913 A1 * | | 12/2017 | G02B 27/0172 |

OTHER PUBLICATIONS

Joel A. Silver, "Simple dense-pattern optical multipass cells," Appl. Opt. 44, 6545-6556 (2005) (Year: 2005).*

Yun-Han Lee, Kun Yin, and Shin-Tson Wu, "Reflective polarization volume gratings for high efficiency waveguide-coupling augmented reality displays," Opt. Express 25, 27008-27014 (Year: 2017).*

Tan G, Lee YH, Zhan T, Yang J, Liu S, Zhao D, Wu ST. Foveated imaging for near-eye displays. Opt Express. Sep. 17, 2018;26(19):25076-25085. doi: 10.1364/OE.26.025076. PMID: 30469615. (2017) (Year: 2017).*

Lee, Y.-H., Tan, G., Yin, K., Zhan, T., and Wu, S.-T. (2018) Compact see-through near-eye display with depth adaption. Jnl Soc Info Display, 26: 64-70. doi: 10.1002/jsid.635. (Year: 2018).*

Nelson V. Tabiryan, Svetlana V. Serak, David E. Roberts, Diane M. Steeves, and Brian R. Kimball, "Thin waveplate lenses of switchable focal length—new generation in optics," Opt. Express 23, 25783-25794 (2015) (Year: 2015).*

Heshmat et al., Photography optics in the time dimension, Nature Photonics, 560, V. 12, Sep. 2018, 560-566. (Year: 2018).*

Matheson, Rob, Novel optics for ultrafast cameras create new possibilities for imaging, MIT News, Aug. 2018, https://news.mit.edu/2018/novel-optics-ultrafast-cameras-create-new-possibilities-imaging-0813 (Year: 2018).*

(56) References Cited

OTHER PUBLICATIONS

MIT Media Lab, What if we could design optics in time instead of space? Rethinking photography optics in the time dimension, https://web.media.mit.edu/~barmak/Time-folded.html (Year: 2018).*
Office Action for European Application No. 19879944.7, dated Aug. 23, 2022, 12 pages.
Extended European Search Report for European Patent Application No. 19879944.7, dated Nov. 24, 2022, 20 pages.

* cited by examiner

COMPACT POLARIZATION-BASED MULTI-PASS OPTICAL ARCHITECTURES

CROSS-REFERENCE

This application claims priority to U.S. Provisional Application No. 62/755,345 filed Nov. 2, 2018, the contents of which are incorporated herein by reference in its entirety.

BACKGROUND

Polarization has been used to produce an additional round-trip of an optical cavity formed by a partial reflector and a polarization splitter (e.g., U.S. Pat. No. 6,075,651). These structures can be used to produce compact wide-angle lenses and increased optical pathlength. The prior art describes a ferroelectric liquid-crystal switch preceding such a lens that allows light to execute either a single-pass of the cavity, or an additional round-trip of the cavity (e.g., U.S. Pat. No. 8,767,284).

SUMMARY

Disclosed herein is an on-axis optical system that includes a linear polarizer; an optical switch that can be controlled to selectively either pass light without converting its state of polarization in a first optical switch state, or convert a first linear state of polarization to a second linear state of polarization that is orthogonal to the first linear state of polarization in a second optical switch state; a first reflective polarizer that reflects light of one linear state of polarization and transmits light of an orthogonal linear state of polarization, the first reflective polarizer having a shape with a radius of curvature F11; and a second reflective polarizer that reflects light of the orthogonal linear state of polarization and transmits light of the one linear state of polarization, the second reflective polarizer having a shape with a radius of curvature R2; wherein each of the linear polarizer, optical switch, and first and second reflective polarizers are positioned in a co-axial manner.

An observer that is located within both a focal length of the first reflective polarizer and a focal length of the second reflective polarizer may observe a self-image with switchable magnification.

Also disclosed in an off-axis optical system that includes a linear polarizer a first optical switch that can be controlled to selectively either pass light without converting its state of polarization in a first optical switch state, or convert a first linear state of polarization to a second linear state of polarization that is orthogonal to the first linear state of polarization in a second optical switch state; a first reflective polarizer that reflects light of one linear state of polarization and transmits light of an orthogonal linear state of polarization, the first reflective polarizer having a shape with a radius of curvature R1; a second reflective polarizer that reflects light of the orthogonal linear state of polarization and transmits light of the one linear state of polarization, the second reflective polarizer having a shape with a radius of curvature R2; a second optical switch that can be controlled to selectively either pass light without converting its state of polarization in a first optical switch state, or convert a first linear state of polarization to a second linear state of polarization that is orthogonal to the first linear state of polarization in a second optical switch state; a third reflective polarizer that reflects light of one linear state of polarization and transmits light of an orthogonal linear state of polarization, the third reflective polarizer having a shape with a radius of curvature R3; and a fourth reflective polarizer that reflects light of the orthogonal linear state of polarization and transmits light of the one linear state of polarization, the fourth reflective polarizer having a shape with a radius of curvature R4. The first and second reflective polarizers are positioned adjacent to each other and in an aligned fashion and the third and fourth reflective polarizers are positioned adjacent to each other and in an aligned fashion, so that depending on the state of polarization of light impinging thereupon, one of the first and second reflective polarizers will reflect light in a folding fashion and one of the third and fourth reflective polarizers will reflect light in a folding fashion. The first and second optical switch can each be controlled so one of four different optical powers can be achieved by the system, the four powers being R1+R3, R1+R4, R2+R3, and R2+R4.

Also disclosed is an optical system for controlling light from a display that can be observed by an observer, the system including a display device transmitting a circular state of polarization; a pair of optical cavities, including a first cavity and a second cavity, with a shared central partial reflector and that are defined at opposite ends by a first reflective polarizer and a second reflective polarizer, respectively, wherein each of the first and second optical cavities include a separate quarter-wave retarder; and an output polarizer. The light passed by the system to the observer includes a first light component that transmits through the first cavity and recirculates in the second cavity and a second light component that recirculates in the first cavity and transmits through the second cavity.

The geometry of the first reflective polarizer and the second reflective polarizer are the same. The image formed using the first cavity and the image formed using the second cavity are superimposed at the viewer.

Also disclosed is an optical system that provides a selective amount of magnification of a displayed image to an observer, the system including a first digital polarization switch adjacent to the display to control the state of polarization of the light entering the system; a pair of optical cavities, including a first cavity and a second cavity, with a shared central polarization splitter and that are defined at opposite ends by a first reflective polarizer having a radius of curvature R1 and a second reflective polarizer having a radius of curvature R2, respectively, wherein each of the first and second optical cavities include a separate quarter-wave retarder; and a second digital polarization switch adjacent to the observer to control which light exits the system, based on the state of polarization of the light impinging upon the second digital polarization switch. The light passed out of the system to the observer includes a first light component that passes through the first cavity once and the second cavity once, a second light component that passes through the first cavity three times and the second cavity once, a third light component that passes through the first cavity once and the second cavity three times, and a fourth light component that passes through the first cavity three times and the second cavity three times. Each of the first and second digital polarization switches have two states and thus the combination of the two switches has four possible states, with each one of the states of the combination corresponding to one of the first, second, third, and fourth components of light passed out of the system. Each of the four components of light is a magnification of the displayed image, with the amount of magnification determined by the number of times that each light component was reflected off of the first reflective polarizer and the number of times that each light component was reflected off of the second reflective polarizer.

The first digital polarization switch may include a linear polarizer, an optical switch, and a quarter-wave retarder. The second digital polarization switch may include a quarter-wave retarder, an optical switch, and a linear polarizer.

DETAILED DESCRIPTION

Polarization splitters, or reflective-polarizers, include wire-grid polarizers (WGPs), multi-layer stretched films (e.g. 3M DBEF), and cholesteric liquid crystals. These polarization splitters are capable of retro-reflecting one polarization, unlike splitters that rely upon a tilted interface (e.g. the McNeille PBS). Single-axis curvature of such elements can be accomplished stress-free (enabling e.g. cylindrical power in reflection), and it has been shown that wire-grid polarizers can have compound curvature via thermoforming (enabling e.g. spherical power in reflection). Thermoformed WGPs can be used to create reflective elements that can be used as (e.g.) concave or convex mirrors. They can essentially be formed into any desired reflective element, with the additional property of being polarization sensitive. When light of a particular linear state-of-polarization (SOP) is introduced to a WGP, it may be reflected as from a conventional reflective optical element. When light of the orthogonal SOP is introduced to the WGP, it may be fully transmitted.

In one arrangement, a pair of WGP layers are arranged in series, where a polarization switch can create a pair of distinct optical reflected outputs. In one state of the polarization switch, a first WGP reflects the light, and in a second state of the polarization switch, a second WGP reflects the light. The polarization switch can be a linear polarizer followed by a liquid crystal switch. In one example, one WGP is planar, and the other has concave curvature. An observer would see a mirror that can be operated both as a conventional mirror and as a concave magnifier via the application of a voltage to the LC device. In another example, each of the crossed WGPs has a distinct radius of curvature, allowing switching between two focal lengths. In a third embodiment both reflectors are planar and switching is used to create a pathlength change, which can be useful for (e.g.) non-mechanical zoom-lenses.

In another arrangement, the switchable reflective element is operated off-normal. By tilting the WGP arrangement by (e.g.) 45° with respect to an input ray, input and output light can travel along separate paths. As before, this allows switching between two reflective optical elements. It also allows cascading of stages. For instance, a pair of digital polarization switches, combined with two pairs of reflective WGPs can produce four output focal lengths.

In another arrangement, architectures using pairs of optical cavities can produce unique benefits. An optical cavity can include a non-polarizing partial-reflector and a polarization-splitter bracketing an optical element that converts a polarized input to the orthogonal state-of-polarization (SOP) in double-pass. These architectures can use a shared optical element to create a pair of cavities that can possess certain functional symmetry. In one configuration, a pair of (e.g. concave) polarization-splitters with the same optical power form the outer elements of the structure, with a shared central planar partial reflector. The architecture can double the efficiency of a single-cavity compact wide-angle collimator (WAC) from a theoretical 25% to 50%.

In another configuration, polarization-insensitive partial-reflectors form the outer elements of the structure, with a shared central polarization-splitter. When combined with one or more wavelength-insensitive polarization switches, the composite optical-path selected for transmission can be electrically configured. A pair of digital polarization switches arranged symmetrically with respect to the shared polarization-splitter can create four optical states in a compact unit.

Figure 1A:
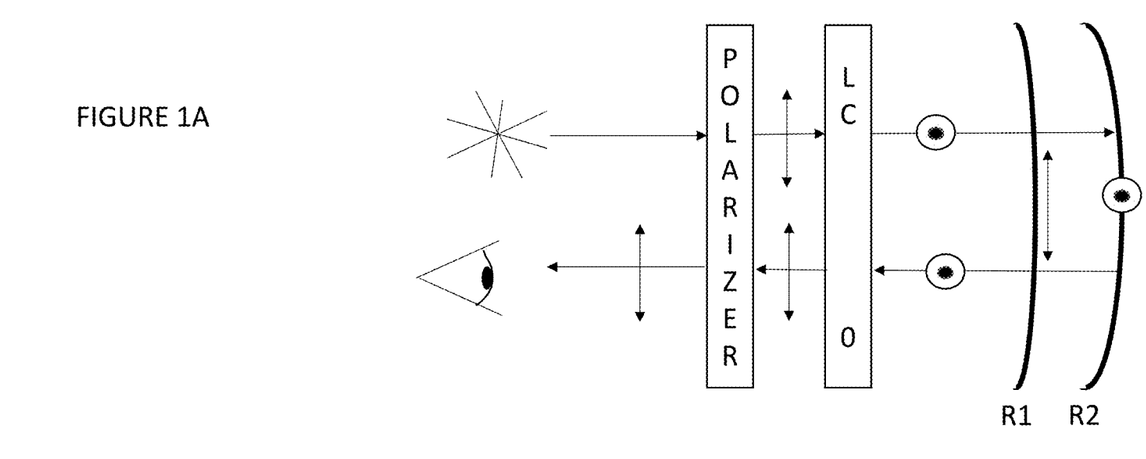
FIG. 1A. An on-axis digital switchable reflective optical element in a first state.
Figure 1B:
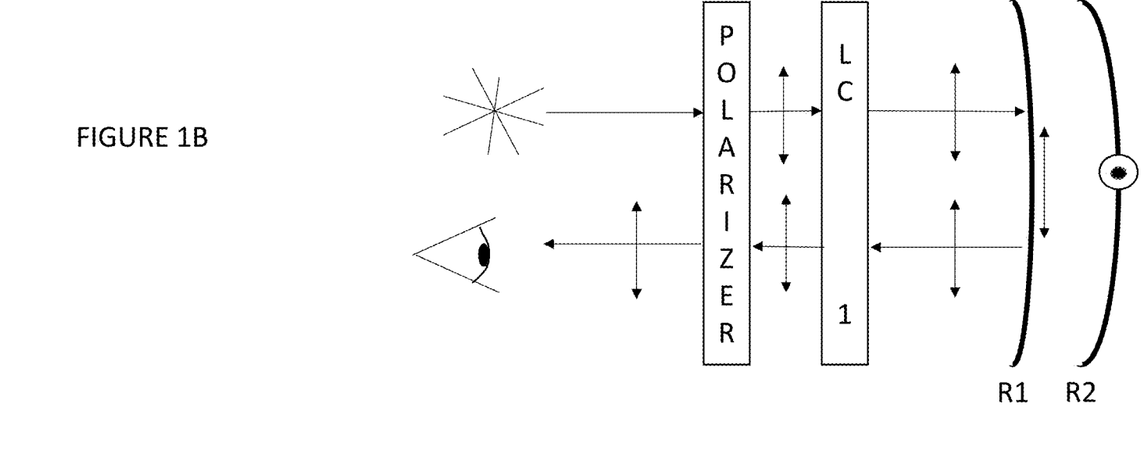
FIG. 1B. An on-axis digital switchable reflective optical element in a second state.

FIGS. 1A and 1B show an example of a switchable mirror. The situation differs for FIGS. 1A and 1B with regard to the state of polarization of a liquid crystal (LC) switch. Randomly polarized light is incident on a linear polarizer, as used in a typical direct-view LCD. The polarizer may be antireflection coated or have a matte finish (or anti-glare). This is laminated to the liquid crystal switch, such as a twisted-nematic, anti-parallel rubbed nematic, vertically-aligned (VA) nematic, parallel-aligned nematic (π-cell) or in-plane switch (IPS nematic or ferroelectric liquid crystal). The LC switch typically appears isotropic at normal incidence in one voltage state (typically energized for most, but unenergized for VA), and maximally manipulates the state-of-polarization (SOP) in the unenergized state. Compensation layers can be introduced to improve the off-axis performance. Wide angle achromatic switches (self-compensating switch, e.g. Sharp, U.S. Pat. App. No. 62/588,095, the contents of which are incorporated by reference herein) are particularly attractive for avoiding cross-talk between the two states for any wavelength or ray angle. The example shows two WGP layers in series and in close proximity. Both are thermoformed, where layer 1 has a radius of curvature R1, and layer 2 has radius of curvature R2.

Unpolarized input light impinges upon the polarizer, orthogonal to the absorption axis, and then the light passing through impinges upon the LC device. For an exemplary LC device, the polarization is converted to the orthogonal SOP in the unenergized state (FIG. 1A), passes through the first WGP (R1), and reflects from the second WGP (R2). The reflected light is returned, passing again through the first WGP, the LC device, and the linear polarizer (i.e. reverse order). When energized (FIG. 1B), the LC device passes the SOP incident from the polarizer. This light reflects from the first WGP (R1), and as before, passes back through the LC device and polarizer. If the two WGP layers represent concave mirrors with radii R1 and R2, and an observer is within the focal length of each, they would observe a self-image with switchable magnification.

Figure 2:
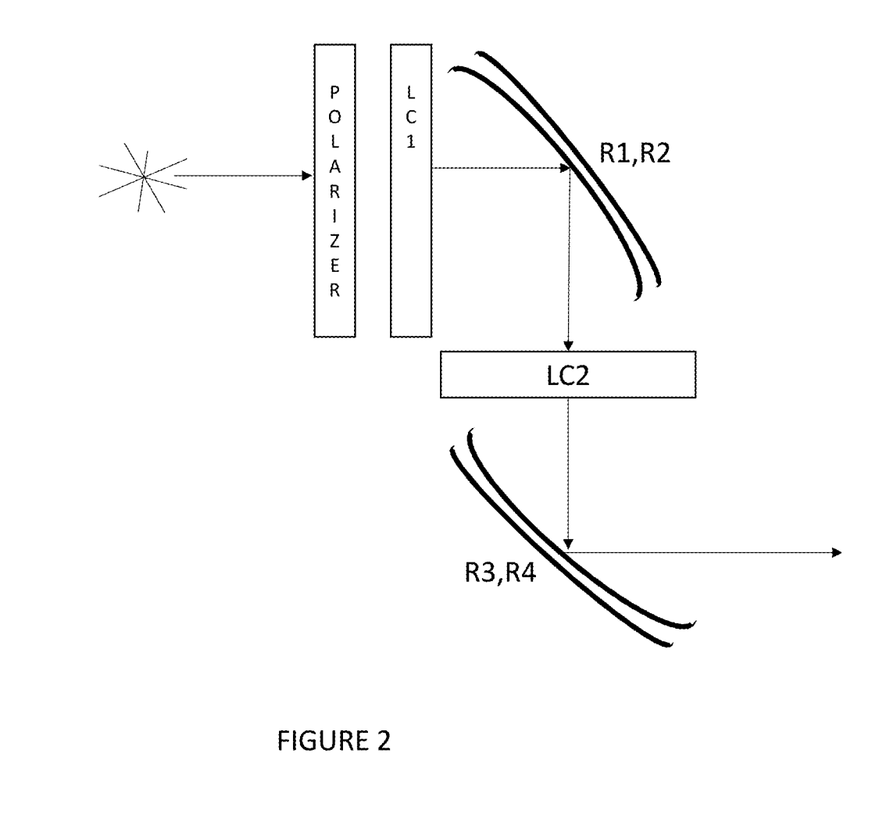
FIG. 2. An off-normal four-state digital switchable reflective optical element.

FIG. 2 shows an off-axis arrangement, where the pairs of WGPs are also used as fold mirrors. An LC device (LC1), as described above, is inserted upstream of the first pair of WGPs and a second LC device is inserted between the first and second set of WGPs (LC2). These devices are operated in a 1-bit switching mode as before. In this example, the first set of WGPs has arbitrary radii R1 and R2 and the second set of WGPs has arbitrary radii of curvature R3 and R4. The pair of switches can produce the four focal lengths shown in Table 1.

TABLE 1

Four states produced by the switchable mirror of FIG. 2.

| LC1 Voltage | LC2 Voltage | Output |
| --- | --- | --- |
| 0 | 0 | (R1 + R3) |
| 0 | 1 | (R1 + R4) |
| 1 | 0 | (R2 + R3) |
| 1 | 1 | (R2 + R4) |

The switchable optical elements have the potential to be used in any optical system that can benefit from compact, light-weight, non-mechanical switching. The formed polarization selective devices can provide various types of optical power (spherical, aspherical, cylindrical, toroidal, etc). Any reflective element is possible that can be fabricated by forming the WGP to modify the local surface-normal distribution in a prescribed manner.

It may be necessary to achieve the desired surface of each WGP in a robust manner by providing additional mechanical support. The functional WGP can be extremely thin relative to the carrier substrate. At the same time, the carrier substrate may not be sufficiently rigid to preserve the shape of the mold after it is released. In one configuration, the WGP on a thin carrier substrate is formed to provide (e.g.) two radii of curvature, that may not be adequately preserved after removal from the mold as a free-standing component. Subsequently, the two thin WGP layers are inserted into a mold cavity with the desired radii of curvature. A resin can then be injected into the cavity, such that after release from the mold, the desired shape is preserved. This resin may have very low birefringence polymer.

Figure 3:
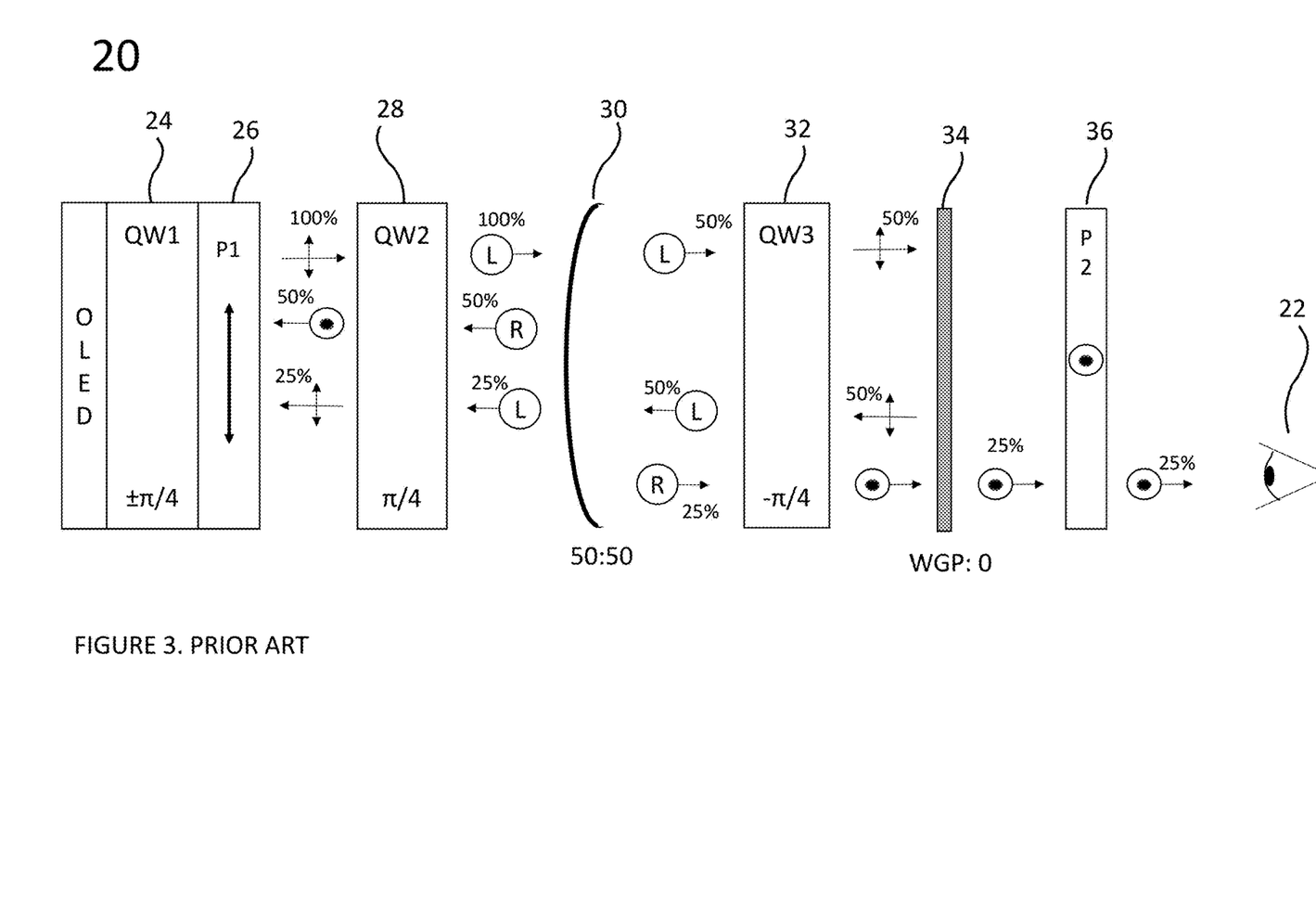
FIG. 3. Prior art polarization-based wide-angle collimator with 25% efficiency of the signal-path.
Figure 4A:
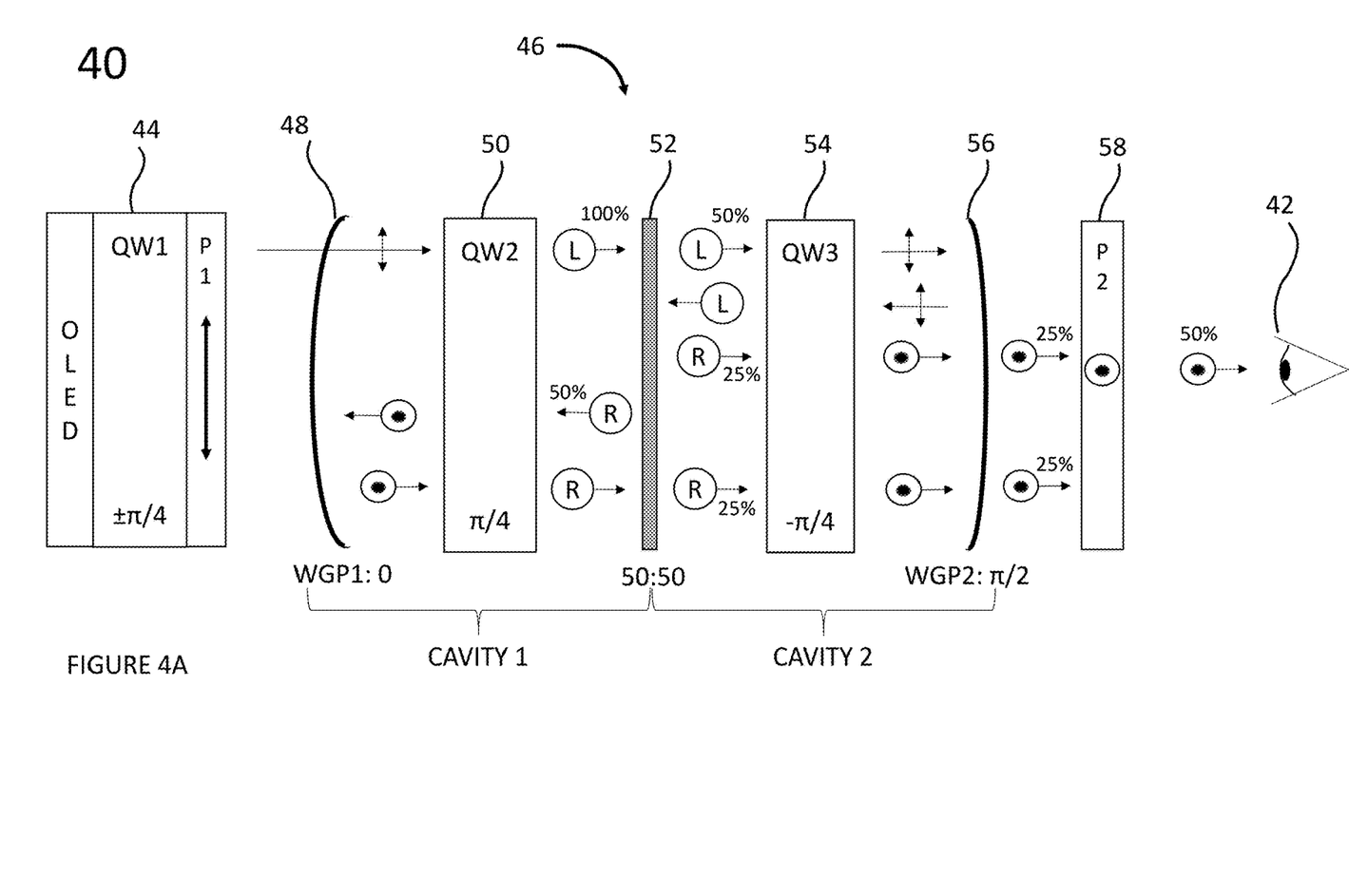
FIG. 4A. A symmetric pair of novel optical cavities providing 50% efficiency of the signal-path.

FIG. 3 shows a prior art wide-angle collimator (WAC) 20, where observer 22 views an electronic display (in this case an organic light-emitting display (OLED)) through the WAC lens. The additional insertion loss of optical components (e.g. polarizer and reflector absorption) is not included in this analysis. The display is followed by a broad-band quarter-wave (QW) retarder 24 and linear polarizer 26 which together act to absorb ambient light reflected from the backplane electrodes. This light is converted to left-hand circular (indicated as an encircled L) by broad-band QW retarder 28 (QW2), 50% of which is transmitted into the cavity by partial reflector 30. A second broad-band QW retarder 32 (QW3) (e.g. crossed with the first) converts light back to the input linear SOP. Reflective polarizer 34 is oriented to return all light (of one linear polarization state) to the cavity. This element may be plano, or may be formed to provide optical power. QW3 converts the linearly-polarized to LH-circular light which then undergoes a handedness change at partial reflector 30 (producing right-hand circular polarization (indicated as an encircled R)), also incurring a further 50% loss on reflection. Half passes through reflector 30 and half passes therethrough. The additional round-trip of the cavity thus converts light to the orthogonal SOP, where it is efficiently transmitted by reflective polarizer 34. This light may then pass through a clean-up polarizer 36. The prior-art WAC lens may thus have a maximum efficiency of 25%, where the remaining 75% is (at best) absorbed by the polarizers in the system. Some of this light may alternatively contribute to stray light and ghosts that degrade contrast and overall quality of the imagery. An additional round-trip of a cavity may be referred to as re-circulating through the cavity. FIG. 4A shows optical system 40, where observer 42 views an electronic display 44, through a high efficiency magnifier (or WAC) 46 as disclosed herein. The magnifier shown has a pair of optical cavities with a shared central partial reflector. The external optical elements shown in this example are identical formed concave reflective polarizers. In this example, an organic light emitting diode (OLED) display is shown as the image source, along with a "ghostbuster" (GB) circular polarizer as described previously. The ghost-buster includes a broad-band quarter-wave retarder (QW1) with optic axis oriented at ±π/4 with respect to polarizer P1, with absorption axis normal to the plane of the figure. The GB extinguishes any backward traveling light from the environment that reflects from the display. Note that the display could alternatively be a liquid-crystal display.

For illustrative purposes, the components are assumed to have zero insertion-loss. Reflective polarizer 48 (WGP1) transmits light from the display polarized in the plane of the figure into Cavity 1. A broad-band quarter-wave retarder 50 (QW2) in this example converts this polarization to left-handed circular. An ideal 50:50 partial reflector 52 transmits half of the incident light (Path 1). The other 50% (Path 2) reflects from the partial reflector and is converted to right-handed circular. The following paragraphs trace the two "signal-paths" of the optical system.

Path 1 is the 50% transmitted by partial-reflector 52 into Cavity 2. Quarter-wave retarder 54 (QW3) in this example has slow-axis perpendicular to that of QW2, so after a first-pass of QW3 the original linear SOP is restored. Reflective polarizer 56 has reflection axis in the plane of the figure, so the light is reflected and receives optical power associated with (in this example) a concave mirror. After a second pass of QW3, light is again left-handed circular. Half of this light (25%) is reflected from the partial reflector with right-handed circular polarization. After a third pass of QW3 the SOP is linear, polarized normal to the figure. This light escapes Cavity 2 and passes through polarizer 58 with absorption axis in the plane of the figure, giving 25% efficiency of Path 1.

Path 2 is the 50% initially reflected by partial-reflector 52 (as described above). The second pass of QW2 converts the SOP to linear, polarized normal to the figure. This light reflects from polarization splitter 48 and receives optical power, associated with (in this example) a concave mirror. After a third pass of QW2, the SOP is again right-handed circular polarized. Half of this light (25%) passes through partial-reflector 52 into Cavity 2. From here, Path 2 light follows that of Path 1 to the viewer. If the geometry of the polarization splitters is well matched, the viewer receives image light representing the superposition of Path 1 and Path 2, and thus the efficiency is twice that of a single-cavity system.

Figure 4B:
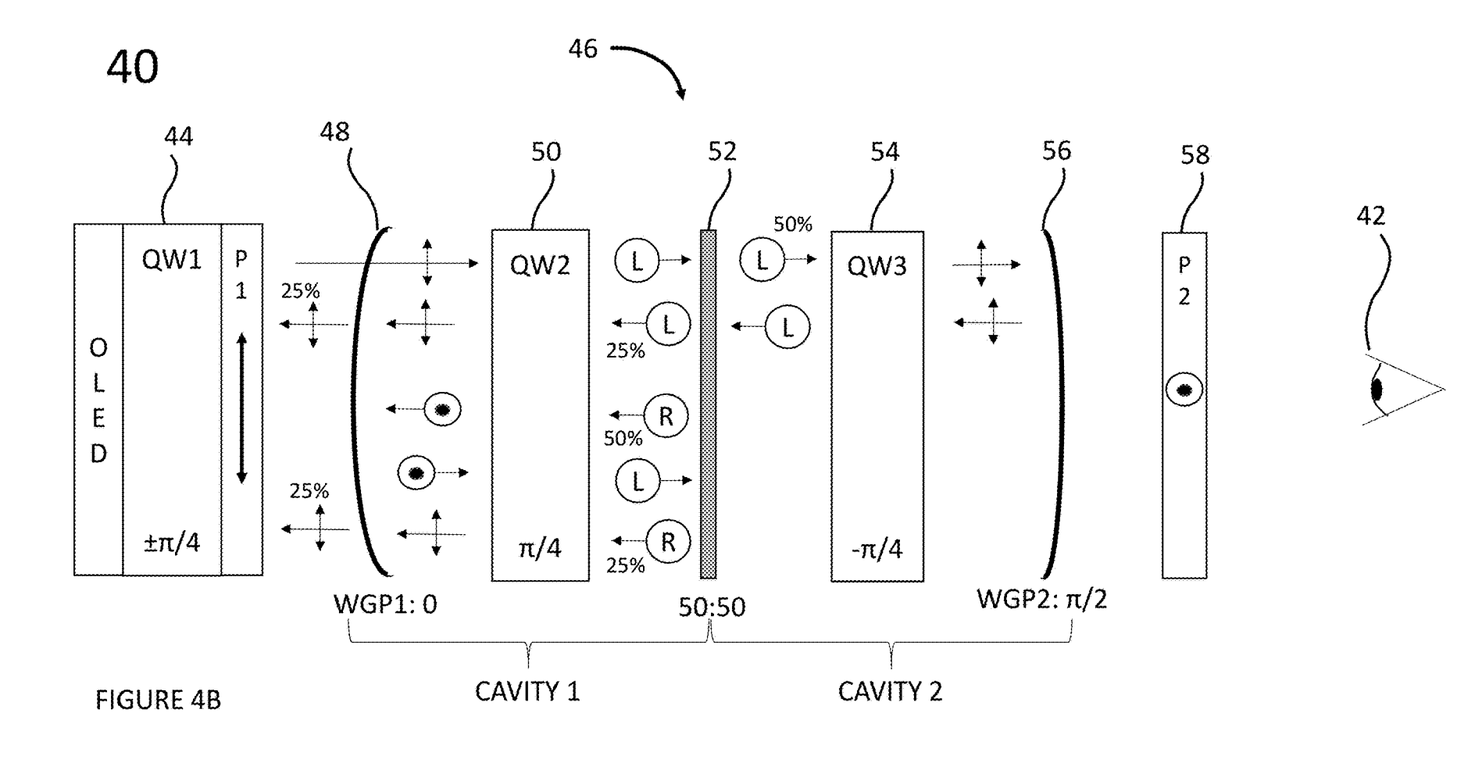
FIG. 4B. The arrangement of FIG. 4A showing the optical path of the rejected (ghost) paths.

In addition to the two signal-paths, the partial reflector spawns a pair of equal-amplitude ghosts that are traced in FIG. 4B. Path 3 light is twice transmitted by partial reflector 52, so it passes twice through Cavity 1 and Cavity 2. As such, 25% is returned to the original SOP and passes through polarization splitter 48, and into the display assembly. In this configuration, specular return from the display is extinguished by the GB. This path receives the optical power associated with polarization splitter 56.

Path 4 light is twice-reflected by partial reflector 52, and thus remains in Cavity 1 for two round-trips. As in the case of Path 3, 25% is returned to the original SOP and passes through polarization splitter 48, and into the display assembly. This path receives the optical power associated with polarization splitter 48.

Given that signal and ghost light exit the magnifier assembly with nominally the same amplitude, the signal-to-ghost contrast may be influenced by two factors: the effectiveness of the display assembly at extinguishing the backward traveling light, and the additional loss associated with residual forward traveling ghost light not extinguished by the display assembly. The latter may enter Cavity 1 polarized in the plane of the figure, and therefore can follow the signal path to the viewer. In the absence of insertion loss, this means that the ghost minimally receives an additional 50% loss in order to reach the viewer.

FIGS. 5A-5D show an example of a reconfigurable magnifier based on polarization switching. The magnifier again contains a pair of cavities. In this example, there are external polarization-insensitive partial reflectors, and a shared central polarization splitter. Both the partial-reflectors and the polarization splitter can have arbitrary geometry (or local surface normal distribution). Polarization switching assemblies are arranged symmetrically on either side of the magnifier assembly. As such, the switch on the input side can determine the path that signal light takes through the magnifier assembly, and the switch on the output side can determine which signal component is selected for transmission to the viewer. Using a pair of broad-band (e.g. liquid crystal) digital switches, an input linear SOP can either be left unchanged or switched to the orthogonal SOP, giving a total of four distinct signal-paths. The following paragraphs trace the four output signal paths that can be selected for transmission to the viewer.

Optical system 60 of this example includes a display assembly 64, a pair of digital polarization switches 68 and 70, and a pair of double-pass cavities with a shared central polarization splitter 76. Viewer 62 receives image light from display 64 via the reconfigurable magnifier assembly 66. Cavity 1 is formed by partial reflector 72 and polarization splitter 76 and Cavity 2 is formed by polarization splitter 76 and partial reflector 80. The specific signal path selected for transmission to the viewer can be determined by the logic states of input polarization switch 68 and output polarization switch 70. In this example, a polarization switch includes a linear polarizer, a broad-band switch that can either leave the input unchanged, or switch all relevant wavelengths to the orthogonal linear SOP, and a broad-band QW retarder that can convert all relevant wavelengths from a linear SOP to a circular SOP. Collectively, the polarization switch elements can function as a broad-band circular polarization "handedness-switch" (HS).

There are many arrangements for the relative orientation of optical components that produce the same four outputs, so the following represents an example of one such arrangement. The input handedness-switch (HS1) and the output handedness switch (HS2) are shown in a mirror arrangement. In the zero-retardation state of linear polarization switch (SW1), quarter-wave retarder (QW1) converts light from linear polarizer 1 to left-handed circular. In the half-wave retardation state of SW1, QW1 transmits right-handed circular polarization. Similarly, in the zero-retardation state of linear polarization switch SW2, quarter-wave retarder (QW4) converts left-handed circular polarization to linear-polarization orthogonal to the absorption axis of Polarizer 2. In the half-wave retardation state of SW2, QW4 converts right-handed circular polarization to linear-polarization orthogonal to the absorption axis of Polarizer 2.

Figure 5A:
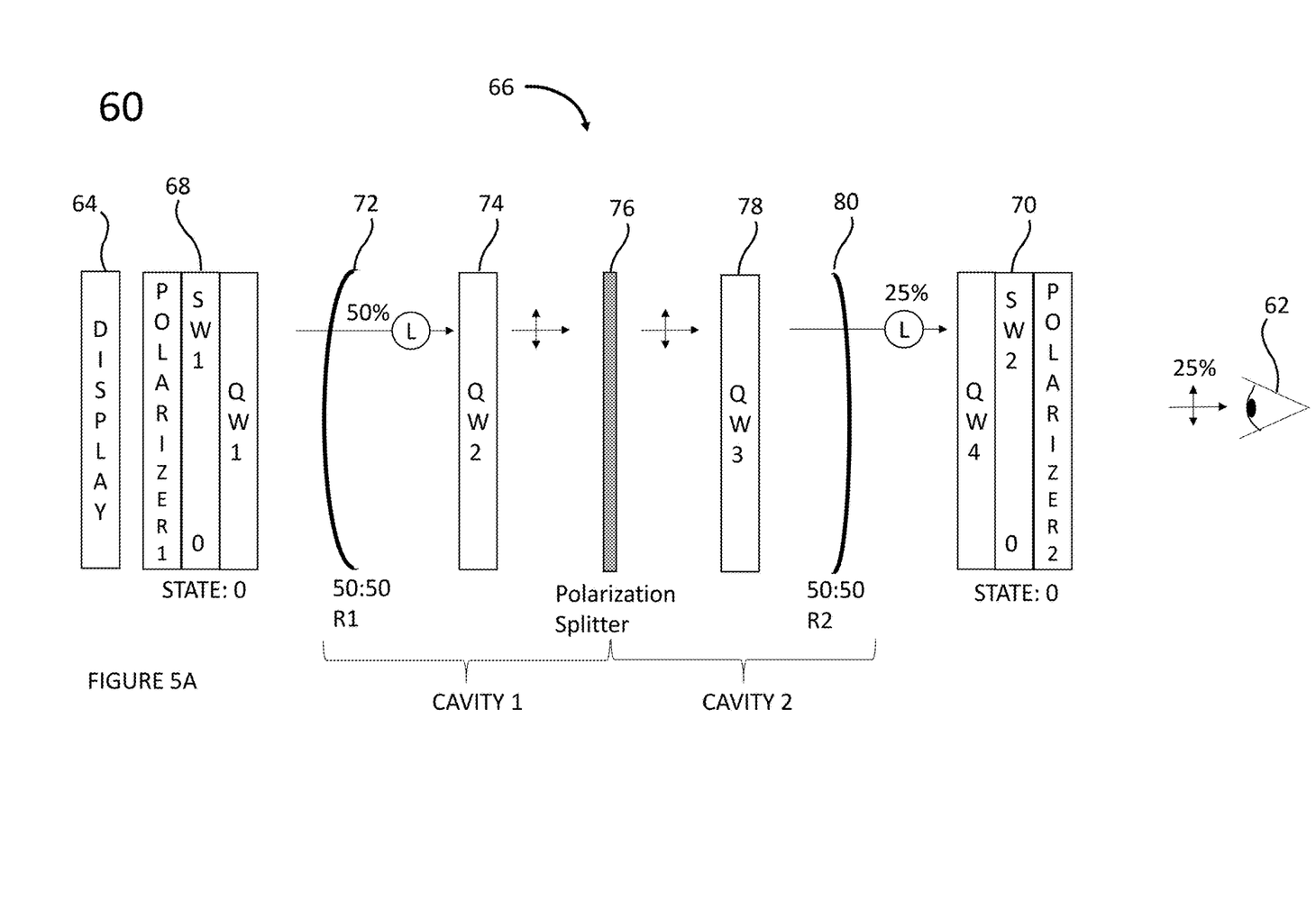
FIG. 5A. A pair of double-pass optical cavities showing a first output, corresponding to the single-pass optical path.

FIG. 5A shows the most direct path to the viewer, or the "single-pass" path. This output may receive no reflective power, as it is not reflected from either of the partial reflectors. Any optical power can thus come from refractive elements (not shown) optionally placed in the optical path which may be common to all output states. As before, for illustrative purposes the efficiency is ideal and neglects insertion losses of the components. In the zero-retardation state of input handedness-switch (HS1) 68, light is transmitted by partial reflector 72 with 50% efficiency. The right-handed circular light reflected by partial reflector 72 (not shown) is returned to the display assembly. This light may preferably be extinguished through whatever means to avoid unwanted ghost images. In this example, quarter-wave retarder 74 (QW2) is oriented with respect to QW1 such that light polarized in the plane of the figure is transmitted when 68 transmits left-handed circular. Polarization splitter 76 is oriented to transmit light polarized in the plane of the figure. A third quarter-wave retarder 78 (QW3) is oriented with optic-axis crossed with that of QW2, so that the original left-handed circular SOP is restored. Half of this light (25%) is transmitted by partial reflector 80. In the zero-retardation state of the second handedness switch (HS2) 70, left-handed circular polarization is selected for transmission, which is converted to light polarized in the plane of the figure and provided to the viewer.

Figure 5B:
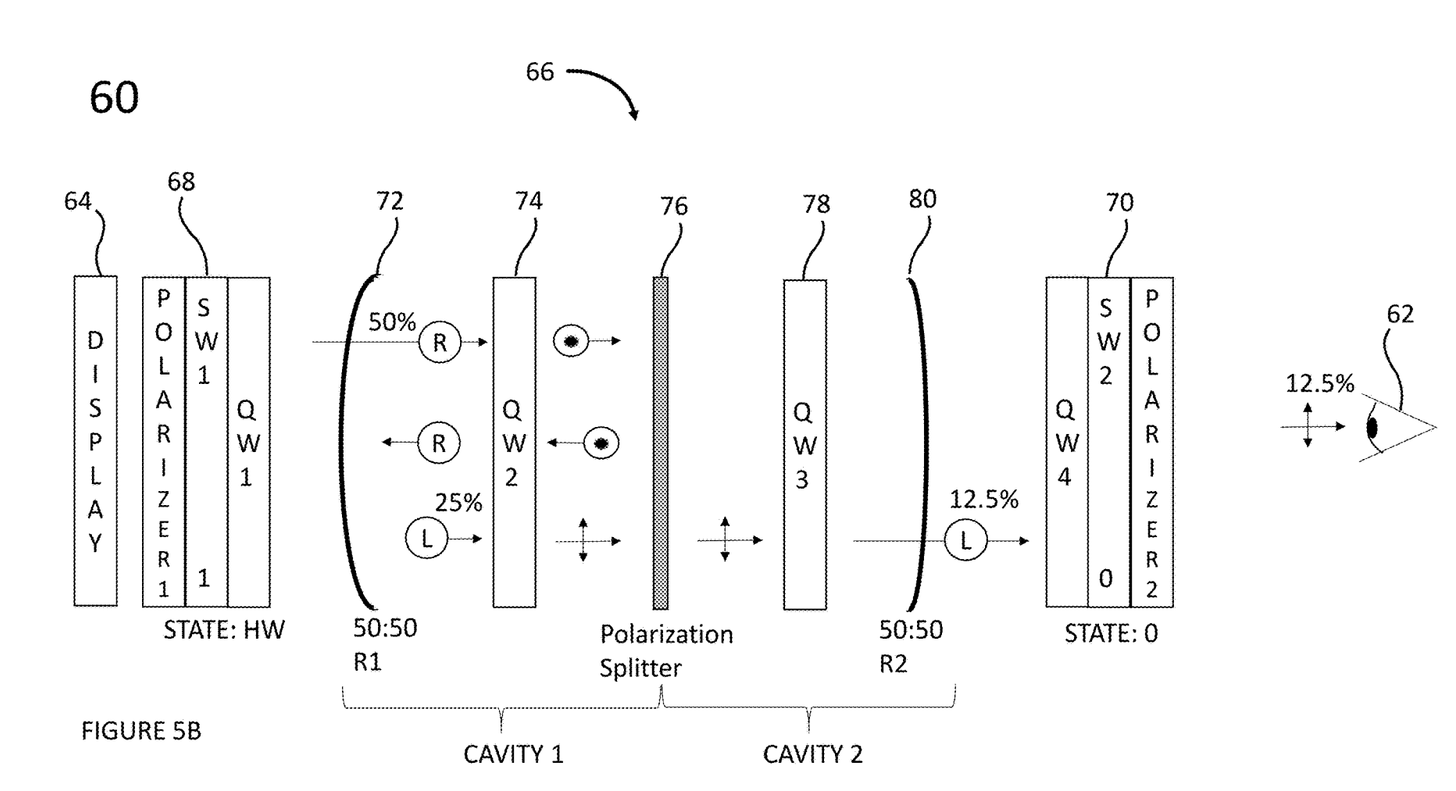
FIG. 5B. The arrangement of FIG. 5A showing a second output, corresponding to an additional round-trip of the first cavity (R1).

FIG. 5B shows the signal path that makes an additional round-trip of Cavity 1. With HS1 in the half-wave retardation state, right-handed circular (RHC) is transmitted and QW2 converts the SOP to linear oriented normal to the figure. This light is reflected by polarization splitter 76 and after a second pass through QW2 74 is converted to RHC. Half of this light (25%) is reflected by partial reflector 72 as LHC and receives the optical power associated with R1. It may also receive the additional optical pathlength associated with a round-trip of Cavity 1. After a third pass through QW2, the light is polarized in the plane of the figure and is transmitted by the polarization splitter 76. This is converted to LHC by QW3 78, and half of this light (12.5%) is transmitted by partial reflector 80. As before, when HS2 is in the zero-retardation state, incoming LHC is selected for transmission to the viewer by conversion to light polarized in the plane of the viewer.

Figure 5C:
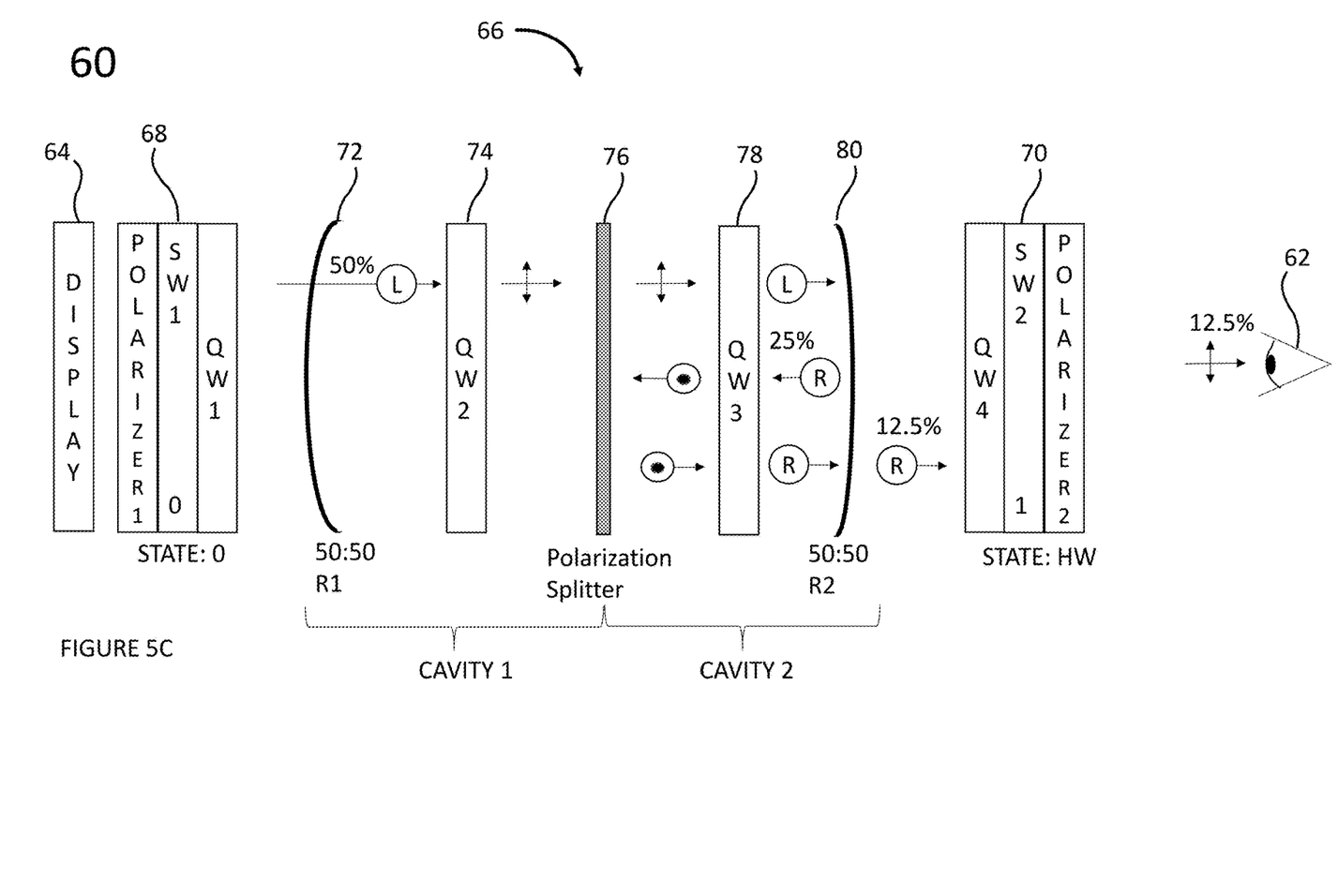
FIG. 5C. The arrangement of FIG. 5A showing a third output, corresponding to an additional round-trip of the second cavity (R2).

FIG. 5C shows the signal path that makes a double-pass of Cavity 2. With HS1 in the zero-retardation state, left-handed circular (LHC) is transmitted and QW2 converts the SOP to linear oriented in the plane of the figure. This light is transmitted by polarization splitter 76 and converted to LHC by QW3. Half of this light (25%) is reflected by partial reflector 80 as RHC and receives the optical power associated with R2. After a second pass of QW3, the SOP is linear oriented normal to the figure. This light is reflected by polarization splitter 76. After a third pass of QW3 the SOP is again RHC and half of this light (12.5%) is transmitted by partial reflector 80. In the half-wave state, switch 70 passes incoming RHC light to the viewer by converting to light polarized in the plane of the figure.

Figure 5D:
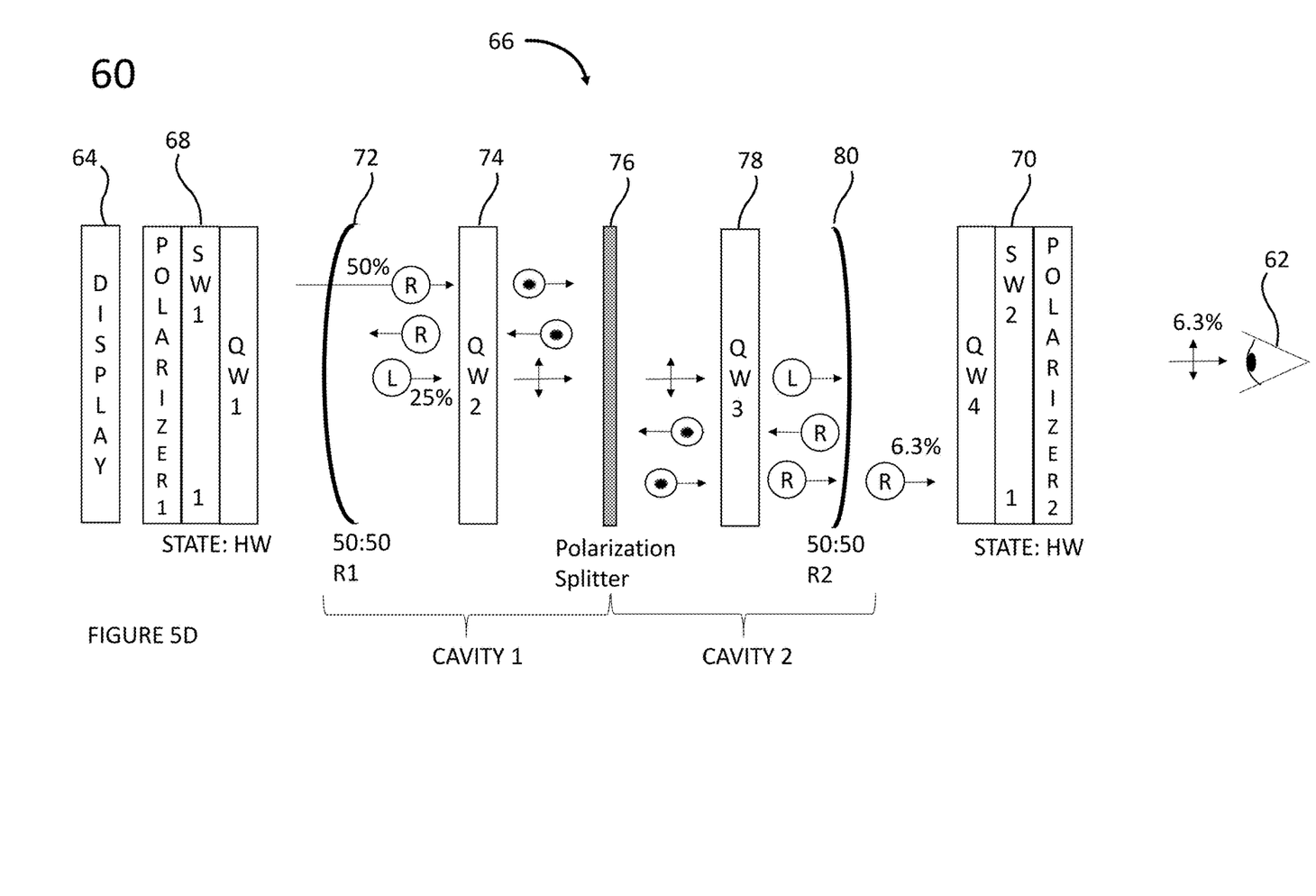
FIG. 5D. The arrangement of FIG. 5A showing a fourth output, corresponding to an additional round-trip of both the first (R1) and second (R2) optical cavities.

FIG. 5D shows the signal path that makes a double-pass of both Cavity 1 and Cavity 2. Because it follows the signal paths of FIGS. 5B and 5C, the detailed trace is not repeated. In this case, HS1 is in the half-wave state to provide an additional round-trip of Cavity 1, and HS2 is in the half-wave state to select the polarization that subsequently traces an additional round-trip of Cavity 2. Because each additional round-trip incurs an additional 50% loss, the overall efficiency of this path may be 6.3%.

There are many arrangements for the orientation of polarizers, QW retarders, polarization switches, and polarization splitters that generate the same four signal paths discussed above. The example shown in FIG. 5 is but one of many such configurations. Moreover, the geometry of the reflective elements including the polarization splitter is arbitrary, including planar, concave, convex, etc. Refractive power from lenses can be introduced to bias the optical power in the single-pass state. The refractive power can work in concert with that introduced via reflections to create four useful optical power states. Also, the arrangement of FIGS. 5A-5D can be used to create four distinct optical path-lengths.

In one configuration, the polarization splitter has compound curvature, such that it appears as a concave reflector for light traversing Cavity 1, and as a convex reflector for light traversing Cavity 2. Of particular interest is that the curved polarization splitter can decouple the three power states. That is, it can introduce power into Cavity 1 and Cavity 2 of opposite sign, and it can substantially introduce no net power into the state traversing both Cavity 1 and Cavity 2. Table 2 shows an example of such a configuration.

TABLE 2

Example of states generated by configuration of FIG. 5A where the polarization splitter 76 has optical power. The R's represent radii of curvature for each surface (where R1 is the radius of curvature of the first 50:50 reflector 72, R2 is the radius of curvature of polarization splitter 76, and R3 is the radius of curvature of the second 50:50 reflector 80).

| State of HS1 | State of HS2 | Power Cavity 1 | Power Cavity 2 | Net Power |
|---|---|---|---|---|
| 0 | 0 | 0 | 0 | 0 |
| HW | 0 | R1 + R2 | 0 | R1 + R2 |
| 0 | HW | 0 | R3 − R2 | R3 − R2 |
| HW | HW | R1 + R2 | R3 − R2 | R1 + R3 |

The single-pass transmission of an optical cavity as shown in FIG. 5 may be 50%, while the state corresponding to an additional round-trip of both Cavity 1 and Cavity 2 may only be 6.3%. According to one configuration, overall throughput may be somewhat balanced by taking into consideration losses that may be associated with the aperture stop for each state of an optical system. Specifically, the smallest aperture state with the poorest light gathering can be selected to coincide with the highest efficiency state of the lens (25%). Conversely, the largest aperture state, which can have the best light gathering can be selected to coincide with the lowest efficiency state of the lens (6.3%).

We claim:

1. A double-cavity optical system with increased light-efficiency, comprising:
a first reflective-polarizer;
a single shared central partial-reflector; and
a second reflective-polarizer;
wherein the first cavity is formed between the first reflective-polarizer and the single shared central partial reflector and the second cavity is formed between the single shared central partial-reflector and the second reflective polarizer, the first and second cavities being distinct cavities separated by the single shared central partial-reflector;
wherein a first light path comprises:
an initial reflection by the shared central partial-reflector; and
a subsequent transmission by the shared central partial-reflector;
wherein a second light path comprises an initial transmission by the shared central partial reflector;
wherein the first light path and the second light path are superimposed after the subsequent transmission of the first light path; and
wherein the geometries of the first reflective-polarizer and the second-reflective polarizer are the same.

2. The optical system of claim 1, wherein the first and second reflective-polarizers are one of a wire-grid, a multi-layer stretched-film, or a cholesteric liquid crystal.

3. The optical system of claim 2, further comprising a quarter-wave retarder in each of the first and second optical cavities.

4. The optical system of claim 1, wherein:
a first image is produced by the first optical cavity;
a second image with a same content as the first image is produced by the second optical cavity; and
the first image and the second image are superimposed at a viewer to create a superimposed image with the same content as the first and second images and with a greater intensity.

5. The optical system of claim 1, wherein the geometries of the first and second reflective-polarizers are one of concave, convex, or flat.

6. The optical system of claim 1, wherein each of cavity 1 and cavity 2 forms a wide-angle collimator.

7. The optical system of claim 1, further including an input electronic display device.

8. The optical system of claim 7, wherein the polarization of display light is selected to maximize the transmission of the first reflective-polarizer.

9. The optical system of claim 8, further including a polarizer after the second reflective-polarizer that maximizes the transmission of light that completes three-passes of cavity 1 and cavity 2.

10. The optical system of claim 8, wherein the display transmits linear polarization that is maximally transmitted by the first wire-grid or stretched-polymer reflective-polarizer.

11. The optical system of claim 8, wherein the display transmits circular polarization that is maximally transmitted by the first cholesteric liquid crystal reflective-polarizer.

12. A high-efficiency imaging system, comprising:
an electronic display;
a first optical cavity formed by a first reflective-polarizer and a single shared partial-reflector; and
a second optical cavity formed by the single shared partial-reflector and a second reflective-polarizer, the first and second optical cavities being distinct cavities separated by the single shared partial-reflector;
wherein the geometries of the first reflective-polarizer and the second reflective-polarizer are the same;
wherein display light is transmitted by the first reflective-polarizer and split into optical Path 1 and Path 2 by the single shared partial-reflector, such that Path 1 display light is transmitted when Path 2 display light is reflected;

wherein Path 1 display light is transmitted by the single shared partial-reflector, reflected by the second reflective-polarizer, reflected by the single shared partial-reflector and transmitted by the second reflective-polarizer;

wherein Path 2 light is reflected by the single shared partial-reflector, reflected by the first reflective-polarizer, transmitted by the single shared partial-reflector and transmitted by the second reflective-polarizer; and wherein Path 1 and Path 2 display light are superimposed at the output of the imaging system, increasing the signal of Path 1 alone and of Path 2 display light alone.

13. The optical system of claim 12, wherein the first reflective-polarizer is a concave reflector for Path 2 display light and the second reflective-polarizer is a concave reflector for Path 1 display light.

14. The optical system of claim 12, wherein the first and second reflective-polarizers are one of a wire-grid, a multi-layer stretched-film, or a cholesteric liquid crystal.

15. The optical system of claim 12, further comprising a quarter-wave retarder in each of the first and second optical cavities.

16. The optical system of claim 12, wherein images produced by the first and second optical cavities are superimposed at a viewer.

17. The optical system of claim 12, wherein the polarization of display light is selected to maximize the transmission of the first reflective-polarizer.

18. The optical system of claim 12, further comprising a polarizer after the second reflective-polarizer that maximizes the transmission of Path 1 and Path 2 light.

19. The optical system of claim 12, wherein the display transmits linear polarization that is maximally transmitted by t-Re-first wire-grid or stretched-polymer reflective-polarizer.

20. The optical system of claim 12, wherein the display transmits circular polarization that is maximally transmitted by a first cholesteric liquid crystal reflective-polarizer.

21. A high-efficiency optical system, comprising:

an electronic display;

a first linear polarizer with absorption-axis parallel to the reflection-axis of a first linear reflective-polarizer;

a first optical cavity formed by the first linear reflective-polarizer, a first quarter-wave retarder, and a single shared central partial-reflector; and a second optical cavity formed by the shared partial-reflector, a second quarter-wave retarder, and a second linear reflective-polarizer;

the first and second cavities being distinct cavities separated by the single shared partial-reflector;

wherein a first light path comprises:

an initial reflection by the shared central partial-reflector; and a subsequent transmission by the shared central partial-reflector;

wherein a second light path comprises an initial transmission by the shared central partial-reflector;

wherein the first light path and the second light path are superimposed after the subsequent transmission of the first light path; and wherein the first quarter-wave retarder and the second quarter-wave retarder convert between linear and circular polarization.

22. The optical system of claim 21, further including a second linear polarizer following the second reflective-polarizer with absorption-axis parallel to the reflection-axis of the second reflective-polarizer.

23. The optical system of claim 21, wherein the first and second reflective-polarizers are concave reflectors.

24. The optical system of claim 21, wherein the first and second reflective-polarizers are one of a wire-grid and a multi-layer stretched-film.

25. The optical system of claim 21, wherein images produced by the first and second optical cavities are superimposed at a viewer.

* * * * *